United States Patent
Elischer et al.

(10) Patent No.: US 6,724,597 B1
(45) Date of Patent: Apr. 20, 2004

(54) PROTECTION DEVICE FOR LOW VOLTAGE NETWORKS

(75) Inventors: Werner Elischer, Spardorf (DE); Gerd Griepentrog, Gutenstetten (DE); Reinhard Maier, Herzogenaurach (DE); Erich Zerbian, Fensterbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/763,450
(22) PCT Filed: Aug. 18, 1999
(86) PCT No.: PCT/DE99/02594
§ 371 (c)(1),
(2), (4) Date: May 25, 2001
(87) PCT Pub. No.: WO00/13281
PCT Pub. Date: Mar. 9, 2000

(30) Foreign Application Priority Data

Aug. 31, 1998 (DE) .......................... 198 39 616

(51) Int. Cl.$^7$ ................................................ H02H 3/00
(52) U.S. Cl. .................................................. 361/93.6
(58) Field of Search .................. 361/87, 93.1, 93.2, 361/93.6, 93.9; 324/207.13, 207.15, 207.21, 522; 336/200

(56) References Cited

U.S. PATENT DOCUMENTS

| | | | |
|---|---|---|---|
| 5,321,380 A | | 6/1994 | Godek et al. ................ 336/232 |
| 5,631,822 A | * | 5/1997 | Silberkleit et al. .......... 363/144 |
| 5,905,615 A | * | 5/1999 | Rivetti et al. ................. 361/63 |
| 6,118,679 A | * | 9/2000 | Smith .......................... 363/70 |
| 6,242,993 B1 | * | 6/2001 | Fleege et al. ................ 335/18 |
| 6,313,639 B1 | * | 11/2001 | Griepentrog ................ 324/500 |
| 6,380,727 B1 | * | 4/2002 | Jitaru ..................... 324/117 R |

FOREIGN PATENT DOCUMENTS

| | | | |
|---|---|---|---|
| DE | C1-19729599 | 2/1999 | ............ H02H/3/44 |
| EP | A2838887 | 4/1998 | ............ H02H/7/30 |

\* cited by examiner

*Primary Examiner*—Ronald W. Leja
(74) *Attorney, Agent, or Firm*—Harness, Dickey & Pierce, P.L.C.

(57) ABSTRACT

A protection device includes a measurement device that is a current transformer which is based on a printed circuit, and an evaluation device that is a unit for early short-circuit identification. The current transformer, which is based on a as printed circuit board, is preferably a multiwinding transformer. The unit for early short-circuit identification operates on the basis of a so-called locus curve method, which uses instantaneous values of the current and current rate of change to identify a short circuit.

10 Claims, 3 Drawing Sheets

PROTECTION DEVICE FOR LOW VOLTAGE NETWORKS

This application is the national phase under 35 U.S.C. § 371 of PCT International Application No. PCT/DE99/02594 which has an International filing date of Aug. 18, 1999, which designated the United States of America.

FIELD OF THE INVENTION

The invention relates to a protection device having an evaluation device, which uses instantaneous values of the current and current rate of change to identify a short circuit. Such a device is the subject-matter of EP 0 838 887 A1.

BACKGROUND OF THE INVENTION

A wide range of implementations of protection devices for low-voltage networks are known from the prior art and are used in particular for disconnection of switching devices when overcurrents occur. By way of example, the measurement device may be in the form of a conventional current transformer. However, such a current transformer normally results in a correspondingly large amount of space being required as a result of the iron circuit that is required and the associated winding space. Nowadays, electronically controlled or microprocessor controlled evaluation circuits, which essentially simulate the function of a bimetallic strip, are generally used for identification of overload situations. Such bimetallic strips are also used in simple devices in conjunction with tripping coils, although these do not offer optimum protection.

In present-day development, switching device design is increasingly demanding space-saving and weight-saving construction, with diagnostic functions and communications capabilities being integrated in the switching device. Thus a need exists for such a device.

SUMMARY OF THE INVENTION

The object of the invention is to provide a protection device which, firstly, allows space-saving and mass-saving construction of the protection device while, secondly, allowing rapid identification of anomalous operating states.

The object is achieved according to the invention, in the case of a protection device of the type mentioned initially, by the totality of the features in patent claim 1. Developments are specified in the dependent claims.

In the invention, a unit for early short-circuit identification based on the current and current rate of change is combined with a multiwinding transformer which is based on a printed circuit and once again produces signals which are proportional to the current and current rate of change. The unit for early short-circuit identification can be produced on the basis of known di/dt-i evaluation and, in particular, on the basis of tolerant locus curves. In the case of the latter, so-called TLC methods, locus curves which take account of different power factors are used as tripping criteria in a locus curve representation of the current and current rate of change.

In the invention, means which have already been proposed in another context in the prior art are combined to form a practicable protection device for low-voltage networks. Current transformers which are based on printed circuit boards and are in the form of multiwinding transformers are known, for example, from U.S. Pat. No. 5,321,380 A; while a method for early short-circuit identification which operates especially on the principle of so-called tolerant locus curves (TLC method) is proposed in prior, not previously published German Patent Application 19 729 599 c1.

BRIEF DESCRIPTION OF THE DRAWING

Further details and advantages of the invention result from the following description of the figures of exemplary embodiments with reference to the drawing and in conjunction with further patent claims. In the figures, and illustrated schematically.

DETAILED DESCRIPTION OF THE PREFERRED EMBODIMENTS

Figure 1:
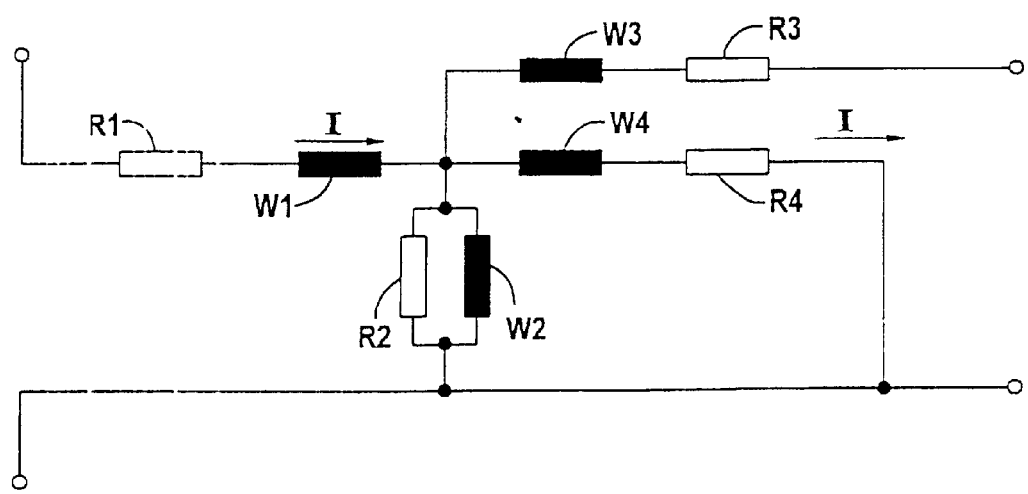
FIG. 1 shows an equivalent circuit of a current transformer which is integrated in a printed circuit board and whose secondary winding is open-circuited.

FIG. 1 shows an equivalent circuit of a current transformer. In detail, the figure shows the primary winding W1 and the secondary windings W2, W3 and W4. The associated non-reactive resistors are annotated R1 to R4. The current is denoted as I.

It can be seen from the resultant equivalent circuit of the current transformer shown in FIG. 1 that the induced voltage across the winding W3 corresponds to the resistive-inductive voltage drop across the resultant impedance of the windings W2 and W4 through which, ignoring the magnetization current and the iron losses, the current to be measured flows. The winding W3 thus remits a voltage which is defined by:

$$u_{W3} = k_R \cdot i(t) + k_X \cdot \frac{di}{dt} \qquad (1)$$

where the constants $k_R$ and $k_x$ depend only on the physical form of the current transformer which is integrated in the printed circuit. Since the winding W4 is short-circuited, the current from this winding W4 and from the operational amplifier circuit is known, so that the current rate of change di/dt from W3 can be obtained by simple calculation from the voltage $u_{W3}$.

Figure 2:
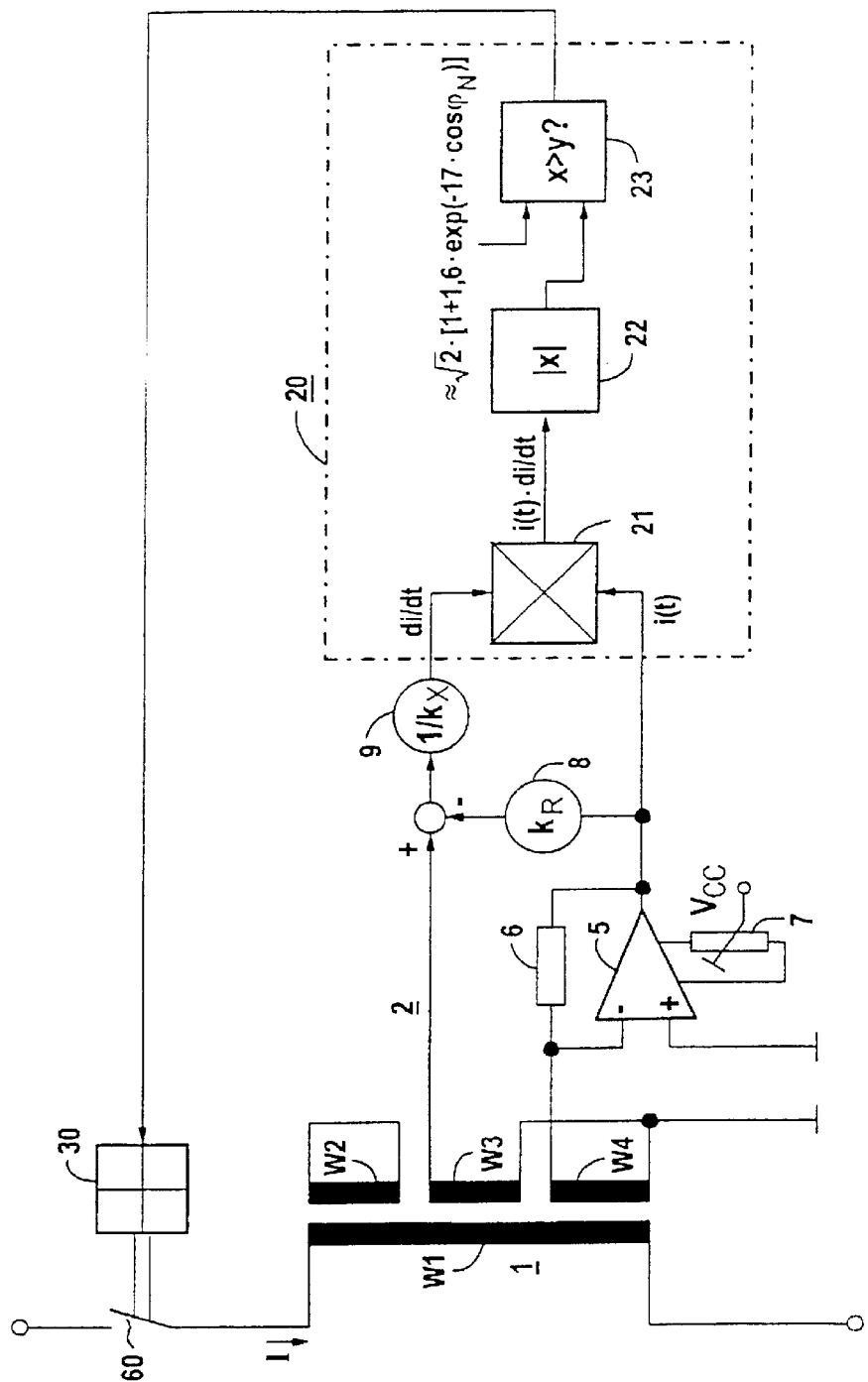
FIGS. 2 and 3 show two different implementations of protection devices with an associated transformer based on a printed circuit board.
Figure 3:
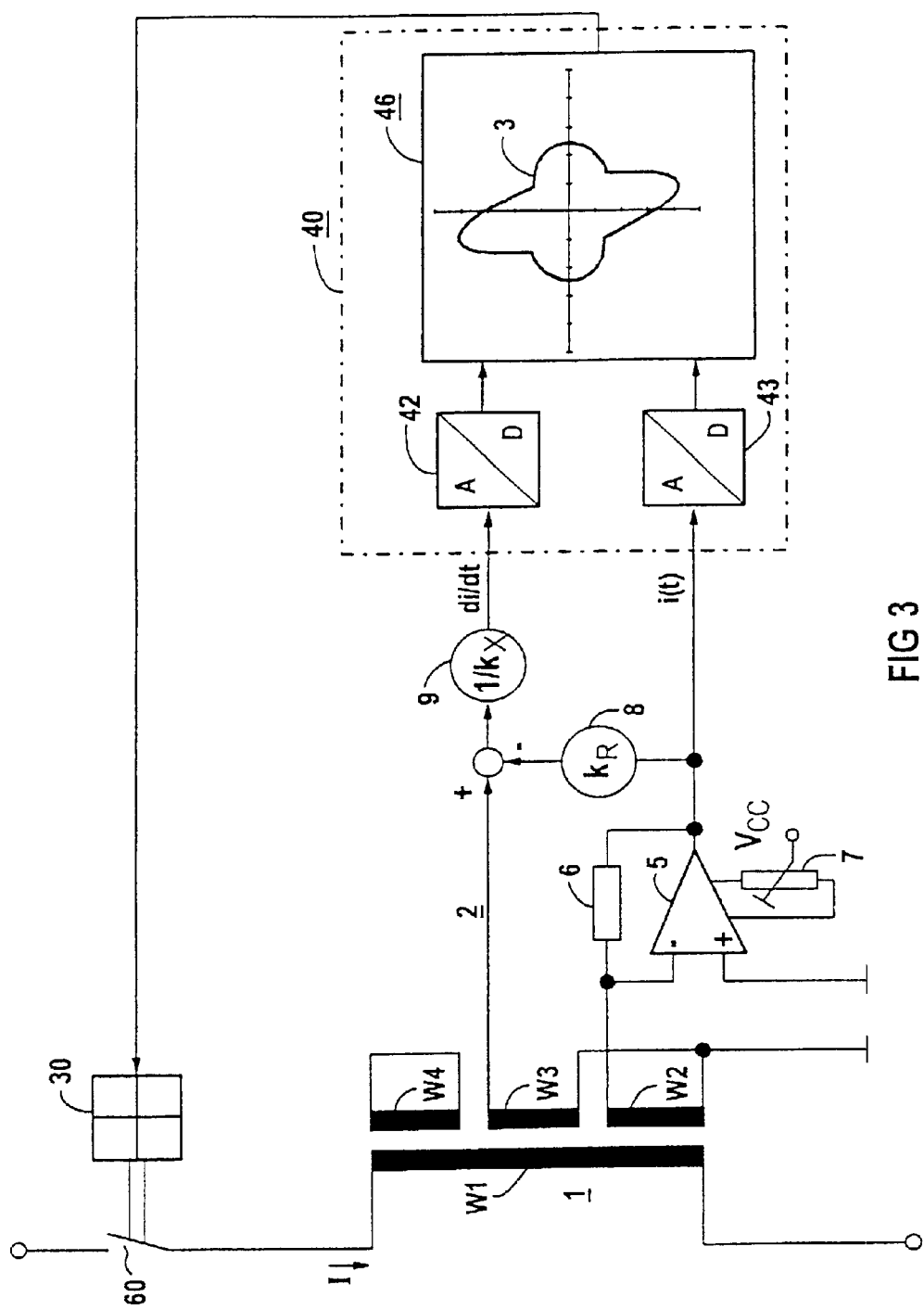

In FIGS. 2 and 3, arrangements for short-circuit protection are designed especially for a single phase. However, they may also be designed for polyphase applications.

In, FIG. 2, 1 denotes the transformer with its windings. The transformer is integrated on a printed circuit board and in this case is designed with the primary winding W1 and the secondary windings W2 to W4 as a four-winding transformer. An amplifier circuit 2 with an operational amplifier 5 and circuitry resistors 6 and 7 on the secondary side is designed as a current/voltage transformer, downstream from which the units 8 and 9 are connected in order to introduce the constants $k_R$ and $1/k_x$.

The signals are passed to a unit 20 for short-circuit identification on the basis of the product of the current i(t) and the current rate of change di/dt, with a circuit with analog signal processing being chosen in FIG. 2. The unit contains a multiplier 21 to form the product i(t)*di/dt, a unit 22 for magnitude formation |x|, and a downstream comparator 23 for comparison with the predetermined threshold value y. If the determined value x exceeds the value y, a tripping signal is produced and a release 30 is activated in order to open a network switch 60.

The threshold value y is obtained in exemplary form from the approximate equation $$\frac{di}{dt} \cdot i > G_{Product} \approx \omega \cdot I_N^2 \cdot \sqrt{2} \cdot [1 + 1,6 \cdot \exp(-17 \cdot \cos\varphi_N)] \Rightarrow \text{short circuit,} \quad (2)$$

where $G_{product}$ is the tripping threshold value, $I_N$ is the root mean square value of the rated current, $\omega$ is the circular frequency of the network, and COS $\phi$N is the power factor of the network during rated operation.

A specific exemplary embodiment, operating using the TLC method, is described in FIG. 3. In detail, 1 once again denotes a transformer with the windings which is integrated on a printed circuit board and whose equivalent circuit is shown in FIG. 1. The signals for i(t) and di/dt are passed to a device 40 for early short-circuit identification using the TLC method which, in a digital version, essentially comprises two A/D converters 42 and 43 and a unit 46 with microprocessor evaluation.

In the unit 46, according to FIG. 3, a locus curve for the abscissa $1/i_N$ and the ordinate $1/((\omega*I_N)*di/dt)$ is plotted on a graph. By way of example, an envelope 3 is shown as the locus curve, which includes all the switching states for a predetermined switching angle range on the one hand and a power factor range of 0.1>cos $\phi$<0.9. The envelope 3 thus takes account of all the locus curves for any given switching angles and for the envelopes which are determined first of all from this for different power factors, in a common curve. This means that a short circuit is present in the situation where a di/dt operating point is outside the envelope 3 during operation of a system. Within the predetermined limits, there is therefore now a relationship between the power factor and the initial current, with the decision feature being referred to as the so-called TLC criterion (tolerant locus curve criterion). Investigations relating to this method are described in detail in the prior German Patent application 197 29 599.C1.

In FIG. 3, the signals are passed via the A/D converters 42 and 43 to the unit for evaluation based on the TLC method. In this case, 46 in FIG. 3 is a unit which operates digitally and evaluates the digitized curves for the current i and the current rate of change di/dt as locus curves. If a value outside the locus curve 3 occurs during operation of a system, the release 30 from FIG. 2 is actuated by the unit 46, and in turn opens a switch 60 over the cable carrying the current.

The unit 46 in FIG. 3 can also be designed on an analog basis, in which case appropriate modifications need to be carried out in the actuation means.

The arrangements described in FIGS. 2 and 3, especially result in a particularly space-saving construction since the multiwinding current transformer is based on a printed circuit board. In comparison to conventional transformers, the space required is reduced by a factor of up to about 50. In addition to the secondary windings of the transformer, the operational amplifier circuit can equally well be provided on the printed circuit boards (which are not illustrated specifically), this operational amplifier circuit being the circuit which, after current-voltage transformation, emits a voltage which is proportional to the measured current level, for further evaluation.

Early identification of short circuits can be achieved in particular by the combination of the current transformer, which is based on a printed circuit board, with the corresponding evaluation algorithm in the unit 46 based on the TLC method. In the event of an overload or short circuit, the relevant circuit is disconnected at an early stage. The information relating to the fault can, equally, be passed on to a higher communication level.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A protection device for low-voltage networks, comprising:

a measurement device, including a current transformer, for determining instantaneous values of a current and a current rate of change and an evaluation device which acts as a unit for early short-circuit identification, and which uses the instantaneous values of the current and the current rate of change to identify a short-circuit, wherein the current transformer is a multiwinding transformer based on a printed circuit board including at least two secondary windings with signals for the current and for the current rate of change being determined from the at least two secondary windings.

2. The protection device as claimed in claim 1, wherein the evaluation device includes a first unit which operates on the basis of determining predetermined values of the signals for the current and current rate of change.

3. The protection device as claimed in claim 2, wherein the product of the current and the current rate of change is taken into account as a limit value in the evaluation device.

4. The protection device as claimed in claim 3, wherein the product (i·di/dt) of the current (i) and the current rate of change (di/dt) is given by the relationship:

$$\frac{di}{dt} \cdot i > G_{Product} \approx \omega \cdot I_N^2 \cdot \sqrt{2} \cdot [1 + 1,6 \cdot \exp(-17 \cdot \cos\varphi_N)] \Rightarrow \text{short circuit,}$$

where $G_{product}$: Tripping threshold value, wherein a short circuit is present if this value is exceeded)

$I_N$: Root mean square value of the rated current $\omega$: Circular frequency of the network $\cos_{\phi N}$: Power factor of the network during rated operation.

5. The protection device as claimed in claim 2, wherein the evaluation device includes a second unit which operates on the basis of tolerance locus curves (TLC method), with locus curves which take account of different power factors (0.1<cos $\phi$<0.9) being used as tripping criteria in a locus curve representation of the current and current rate of change.

6. The protection device as claimed in claim 5, wherein the second unit, which operates using the TLC method, includes digital switching means.

7. The protection device as claimed in claim 5, wherein analog/digital converters are connected between the multiwinding transformer and the evaluation device.

8. The protection device as claimed in claim 7, wherein the unit, which operates using the TLC method, includes analog switching means.

9. The protection device as claimed in claim 6, wherein analog/digital converters are connected between the multiwinding transformer and the evaluation device.

10. The protection device as claimed in claim 9, wherein the second unit, which operates using the TLC method, includes analog switching means.

* * * * *